US007495703B2

(12) United States Patent
Arbuckle

(10) Patent No.: US 7,495,703 B2
(45) Date of Patent: Feb. 24, 2009

(54) ENVIRONMENTALLY SEALED SURVEILLANCE CAMERA

(75) Inventor: James F. Arbuckle, Fresno, CA (US)

(73) Assignee: Pelco, Inc., Clovis, CA (US)

( * ) Notice: Subject to any disclaimer, the term of this patent is extended or adjusted under 35 U.S.C. 154(b) by 904 days.

(21) Appl. No.: 10/877,650

(22) Filed: Jun. 25, 2004

(65) Prior Publication Data

US 2004/0263623 A1 Dec. 30, 2004

Related U.S. Application Data

(60) Provisional application No. 60/483,163, filed on Jun. 27, 2003.

(51) Int. Cl.
*H04N 5/225* (2006.01)
*H04N 9/47* (2006.01)
*G03B 17/08* (2006.01)
*F16L 25/00* (2006.01)

(52) U.S. Cl. ....................... 348/375; 348/373; 348/143; 396/25; 285/420; 285/421

(58) Field of Classification Search ................... 396/25, 396/27; 348/81, 82, 143, 151, 373–376, 348/25, 27; 403/257, 234; 411/15–24, 95, 411/11, 112, 511–529, 947; 285/29, 78, 285/405, 406, 413, 414, 420
See application file for complete search history.

(56) References Cited

U.S. PATENT DOCUMENTS 2,341,970 A * 2/1944 Worel ......................... 403/278
2,482,708 A * 9/1949 Gordinier ................... 269/232
3,087,745 A * 4/1963 Rumbell .................. 285/222.1
3,403,934 A * 10/1968 Butts ..................... 292/341.16
3,513,977 A * 5/1970 Bellinson ..................... 210/94
3,674,291 A * 7/1972 Goldberg .................... 403/338
3,913,955 A * 10/1975 Teja .......................... 285/337
4,312,580 A * 1/1982 Schwomma et al. .......... 396/26
4,614,397 A * 9/1986 Flanigan ..................... 439/569
4,860,038 A * 8/1989 Thatcher et al. ............... 396/25
6,354,749 B1 3/2002 Pfaffengerger, II
6,735,382 B2 * 5/2004 Schneider .................... 396/26
6,938,933 B2 * 9/2005 Starita ........................ 285/364
2002/0054234 A1 5/2002 Patel et al.
2002/0140848 A1 10/2002 Cooper et al.

* cited by examiner

*Primary Examiner*—Nhan T. Tran
*Assistant Examiner*—Euel K Cowan
(74) *Attorney, Agent, or Firm*—Paul T. Kashimba, Esq.

(57) ABSTRACT

A surveillance camera comprising a camera mounted in a housing, a trim ring and dome assembly, a flexible member and a clamping member. The housing and the trim ring and dome assembly have first and second surfaces. One of the first surface of the housing and the first surface of the trim ring and dome assembly has an indentation, and the flexible member is positioned in the indentation. The clamping member can be tightened and is shaped to contact the second surface of the housing and the second surface of the assembly such that when the clamping member is tightened the clamping member causes the housing and the assembly to compress the flexible member so that the flexible member provides a seal between the housing and the assembly.

8 Claims, 5 Drawing Sheets

ENVIRONMENTALLY SEALED SURVEILLANCE CAMERA

CROSS-REFERENCE TO RELATED APPLICATION

This application relates to and claims priority to U.S. Provisional Patent Application Ser. No. 60/483,163, filed Jun. 27, 2003, entitled ENVIRONMENTALLY SEALED SURVEILLANCE CAMERA, the entirety of which is incorporated herein by reference.

STATEMENT REGARDING FEDERALLY SPONSORED RESEARCH OR DEVELOPMENT

N/A

BACKGROUND OF THE INVENTION

This invention relates to surveillance systems and, in particular, to a surveillance camera which is environmentally sealed.

Video surveillance cameras installed in outdoor locations need an enclosure that can withstand a wide range of ambient temperatures and weather conditions without adversely affecting operation of the video camera. Normally, the camera enclosure has a weatherability rating under the Ingress Protection (IP) rating system where the first digit indicates the protection against solid objects and the second digit indicates the protection against liquids. For example, a camera enclosure having a rating of IP66 would not allow any ingress of dust and would not allow harmful quantities of water from heavy seas or water projected in powerful jets from entering the enclosure. A lower IP rating allows greater invasion of dust, contaminants and water, which limits the applications of the surveillance camera and its desirability.

In addition, pressurized enclosures with several screw type fasteners spaced around a flange or trim ring have been used. However, this type of enclosure has allowed the nitrogen or other gases used to create a positive pressure within the enclosure to escape thereby resulting in less than satisfactory performance of the camera and requiring repair service to correct the problem. Accordingly, it is desirable to have a video surveillance camera enclosure that maintains an environmental seal.

SUMMARY OF THE INVENTION

In accordance with the present invention there is provided a surveillance camera comprising a camera mounted in a housing, a trim ring and dome assembly, a flexible member and a clamping member. The housing and the trim ring and dome assembly have first and second surfaces. One of the first surface of the housing and the first surface of the trim ring and dome assembly has an indentation, and the flexible member is positioned in the indentation. The clamping member can be tightened and is shaped to contact the second surface of the housing and the second surface of the assembly such that when the clamping member is tightened the clamping member causes the housing and the assembly to compress the flexible member so that the flexible member provides a seal between the housing and the assembly.

In different embodiments of the surveillance camera of the present invention, the indentation for the flexible member is located in the housing, the assembly, or a first portion of the indentation is located in the housing and a second portion of the indentation is located in the assembly. In one embodiment, the clamping member can have first and second legs that are angled in a V-shape. The second surface of the housing is angled at approximately the same angle as the first leg of the clamping member and the second surface of the assembly is angled at approximately the same angle as the second leg of the clamping member so that when the clamping member is tightened the first and second legs exert a wedging load on the second surfaces of the housing and assembly so that the flexible member is compressed to provide a seal between the housing and the assembly.

In addition, the present invention provides an enclosure for a surveillance camera comprising a housing for mounting a surveillance camera, a trim ring and dome assembly, a flexible member and a clamping member. The housing and the trim ring and dome assembly have first and second surfaces. One of the first surface of the housing and the first surface of the trim ring and dome assembly has an indentation, and the flexible member is positioned in the indentation. The clamping member can be tightened and is shaped to contact the second surface of the housing and the second surface of the assembly such that when the clamping member is tightened the clamping member causes the housing and the assembly to compress the flexible member so that the flexible member provides a seal between the housing and the assembly.

In different embodiments of the enclosure for a surveillance camera of the present invention, the indentation for the flexible member is located in the housing, the assembly, or a first portion of the indentation is located in the housing and a second portion of the indentation is located in the assembly. In one embodiment, the clamping member can have first and second legs that are angled in a V-shape. The second surface of the housing is angled at approximately the same angle as the first leg of the clamping member and the second surface of the assembly is angled at approximately the same angle as the second leg of the clamping member so that when the clamping member is tightened the first and second legs exert a wedging load on the second surfaces of the housing and assembly so that the flexible member is compressed to provide a seal between the housing and the assembly.

Other advantages and applications of the present invention will be made apparent by the following detailed description of the preferred embodiment of the invention.

DETAILED DESCRIPTION OF THE INVENTION

Figure 1:
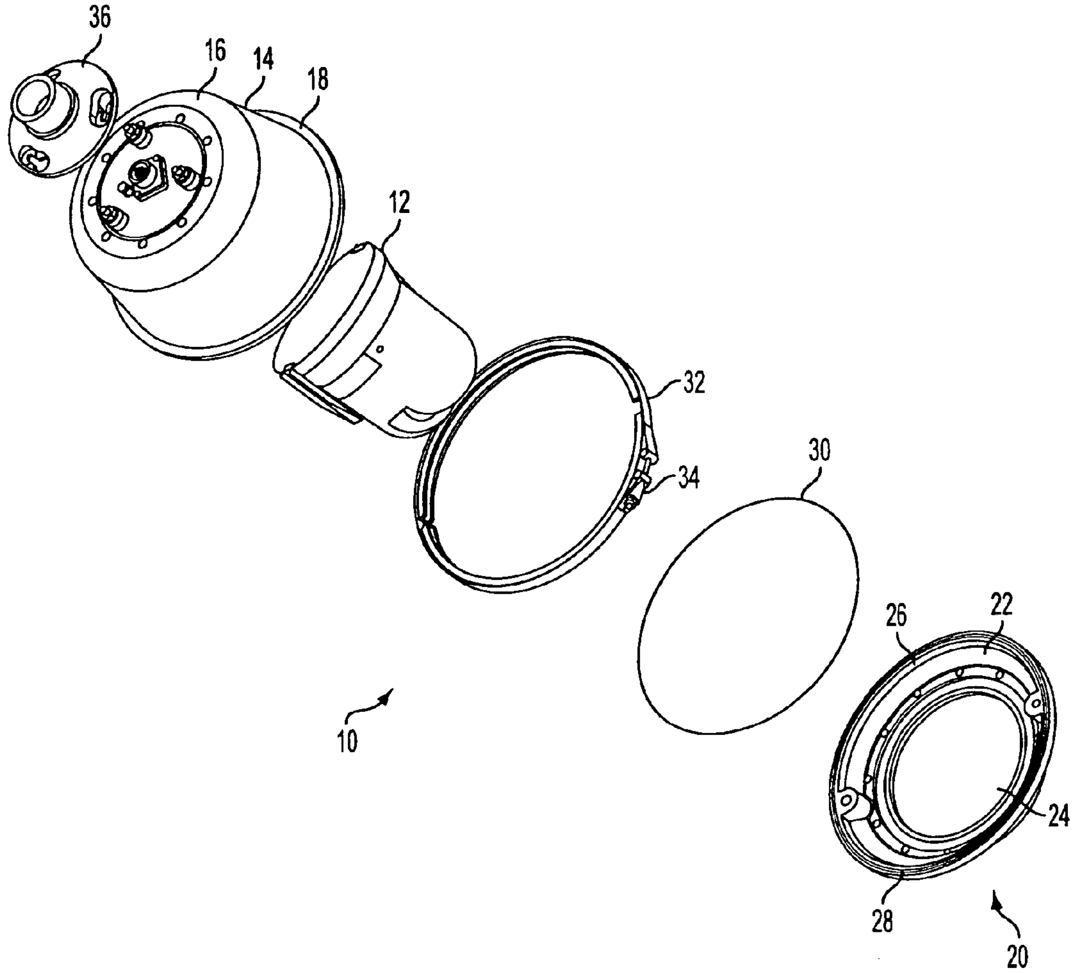
FIG. 1 is an exploded perspective view of a surveillance camera utilizing the present invention.
Figure 2:
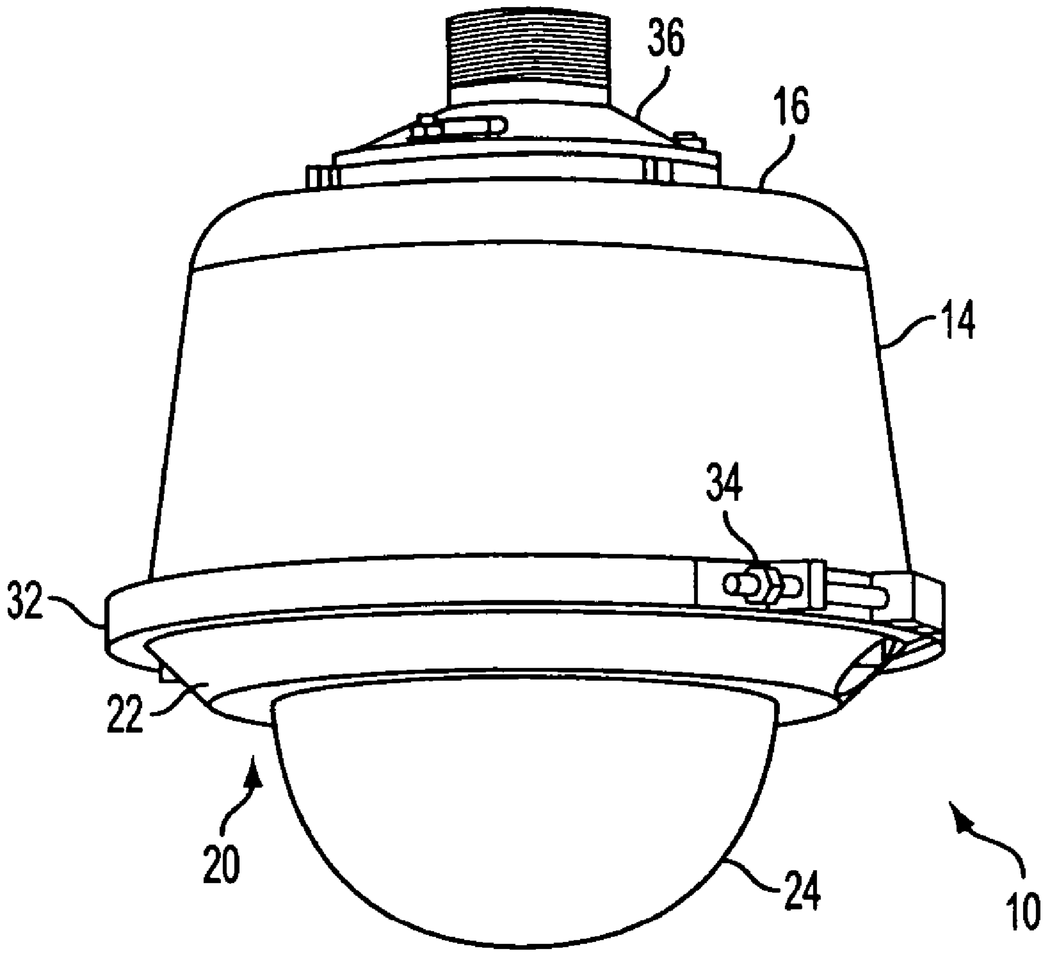
FIG. 2 is an elevational side view of the surveillance camera shown in FIG. 1.

Referring to FIGS. 1 and 2, a surveillance camera 10 is shown with a camera and lens assembly 12, which can be fixed or movable so that it can be panned and tilted to provide a controllable field of view. Housing 14 is cylindrical in shape with a top wall 16 and a flange 18 on the open end opposite top wall 16 and is sized so that camera and lens assembly 12 can be positioned in housing 14. A trim ring and dome assembly 20 has a trim ring 22 and dome 24. Housing 14 and trim ring 22 are made of rigid material, for example, metal or plastic;

dome 24 can be made of, for example, acrylic. Trim ring 22 has a lip 26 that is angled for mating with flange 18. Lip 26 has a notch or indentation 28 that is sized to accommodate flexible seal 30. Flexible seal 30 can be a gasket comprising a flexible member such as an O-ring made of synthetic rubber or other material to make a fluid-tight joint, such as Poron® cellular urethane foam manufactured by Rogers Corporation, Woodstock, Conn., silicone foam, and solid silicone. An adjustable clamping member 32 provides a wedging compression on flange 18 and lip 26 to connect housing 14 and trim ring and dome assembly 20 and to compress flexible seal 30. Clamping member 32 has a suitable fastener 34, such as a screw assembly that adjusts the length of clamping member 32 and tightens around flange 18 and lip 26 thereby applying a compression force to flexible seal 30 to make an environmental seal between housing 14 and trim ring and dome assembly 20. Clamping member 32 can be, for example, a V-band clamp. A mount 36 is connected to housing 14 by threaded members and nuts or other suitable means. Mount 36 attaches surveillance camera 10 to a ceiling mount, pole, arm or other support structure, not shown, in a hanging or inverted position. However, mount 36 is exemplary, and other types of mounts may be used for attaching surveillance camera 10 in any direction or angle required by the surveillance location and application. Housing 14 can be manufactured to include a mount on top wall 16 thereby eliminating mount 36.

Figure 3:
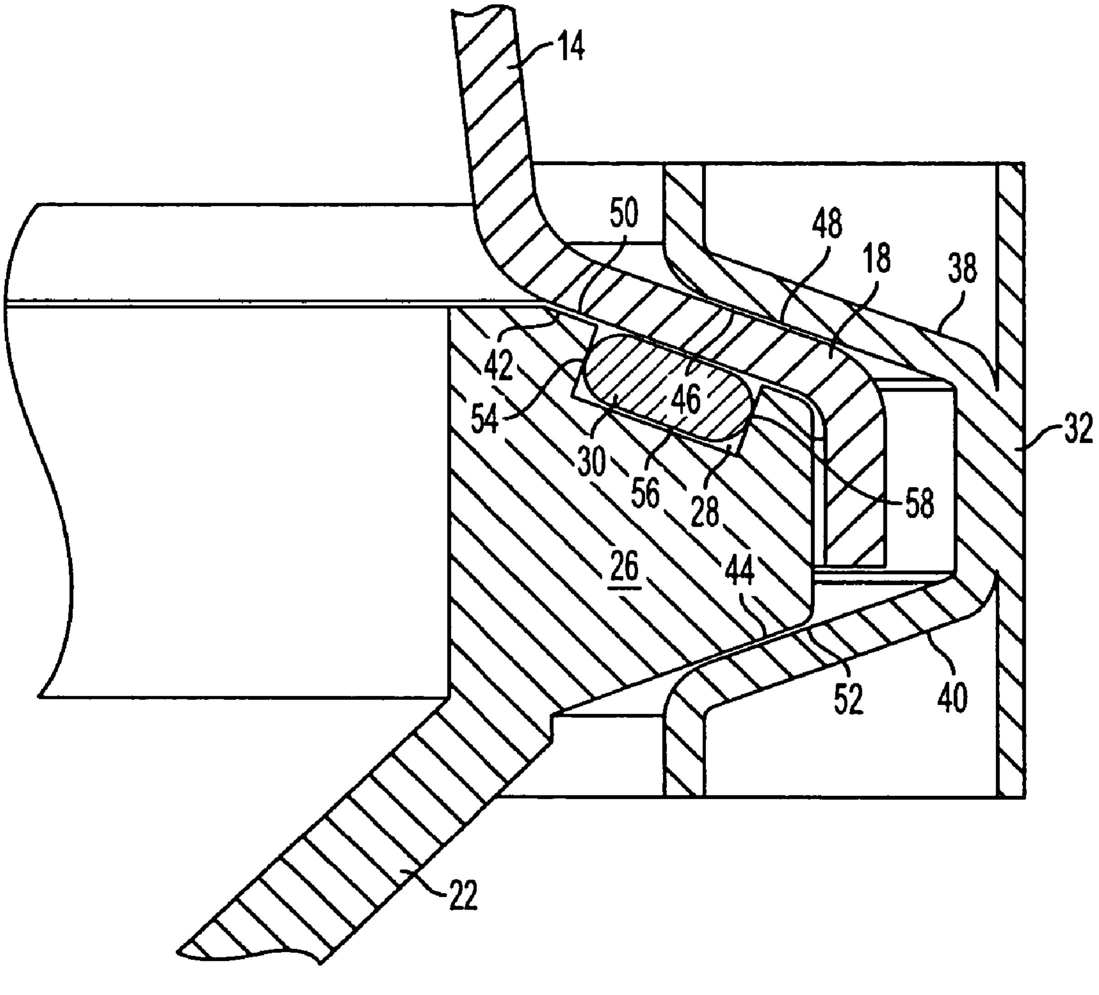
FIG. 3 is a side elevational view, in partial cross-section of the present invention.

FIG. 3 illustrates the position of housing 14, trim ring 22, flexible seal 30, and clamping member 32 after clamping member 32 has been tightened. Clamping member 32 has legs 38 and 40 that are angled so that they are positioned in a V-shaped profile. Flange 18 of housing 14 is positioned at an angle similar to the angle of leg 38. Lip 26 has an upper surface 42 that is angled at approximately the same angle as flange 18, and a lower surface 44 that is angled at approximately the same angle as leg 40 of clamping member 32. Flange 18 of housing 14 has an upper surface 46 that contacts inner surface 48 of leg 38. Lower surface 50 of flange 18 contacts upper surface 42 of lip 26. Lower surface 44 of lip 26 contacts inner surface 52 of leg 40. Upper surface 42 has an indentation 28, which is shown as being rectangular with walls 54, 56, and 58. However, indentation 28 can take other shapes such as square, circular, V-shaped, and so forth. Preferably, indentation 28 is sized so that flexible seal 30 is compressed and contacts walls 54, 56, and 58 and lower surface 50 of flange 18 when clamping member 32 has been tightened to exert a wedging load which squeezes flange 18 and lip 6 thereby compressing flexible seal 30 causing it to deform and contact walls 54, 56, and 58 and lower surface 50 of flange 18. The deformation of flexible seal 30 causes it to exert pressure against walls 54, 56, and 58 and lower surface 50 to provide an environmental seal. This arrangement provides the best environmental seal; however, a suitable seal can be provided if flexible seal 30 does not contact all three walls 54, 56, and 58. Generally, in the case of where flexible seal 30 is an O-ring, the size of indentation 28 is determined by choosing an O-ring, determining the amount of deformation of the O-ring that is desired, and then using the diameter of the O-ring and the desired deformation to calculate the size of indentation 28.

Figure 4:
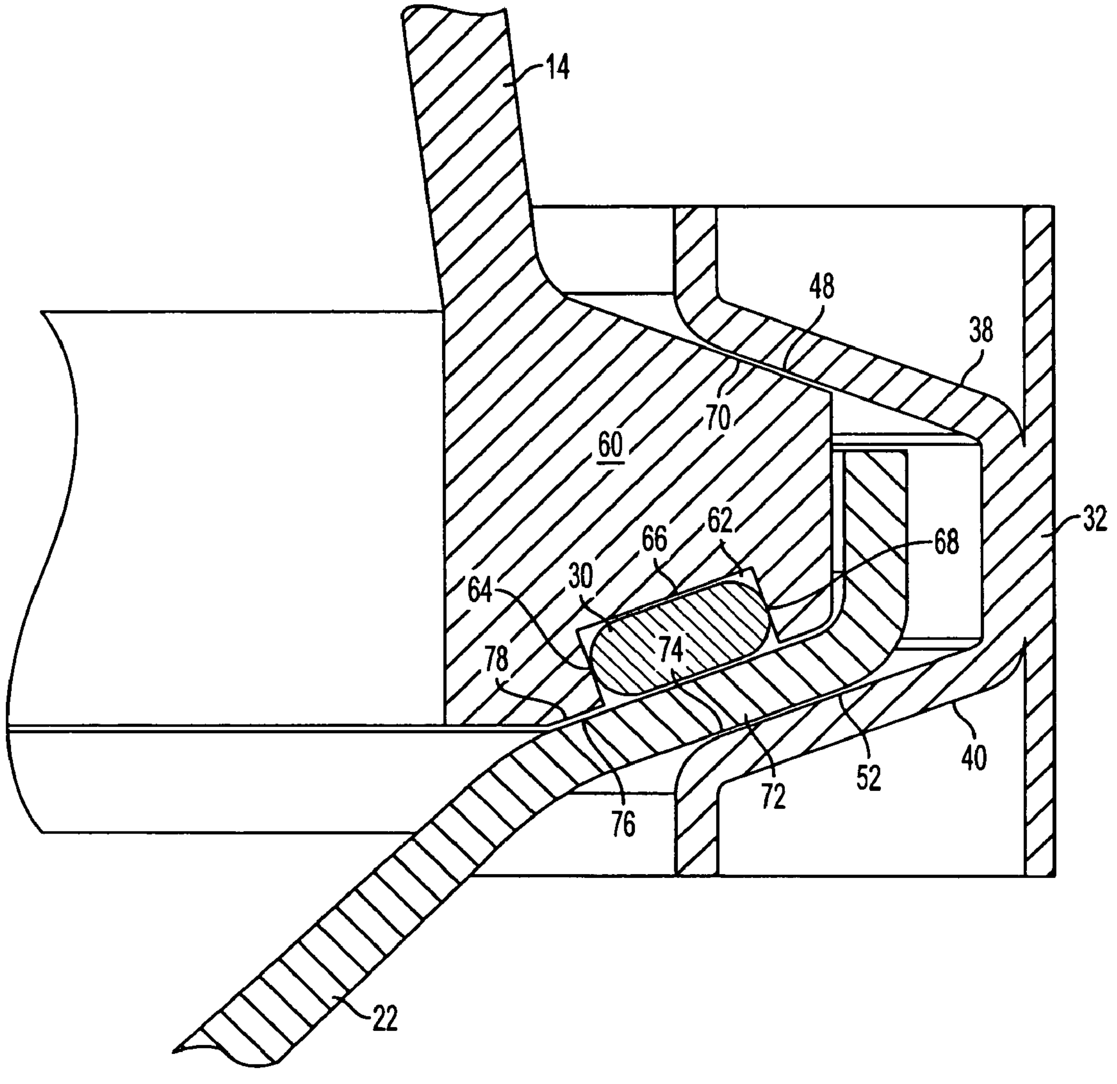
FIG. 4 is a side elevational view, in partial cross-section of an alternative embodiment of the present invention.

An alternative embodiment of the present invention is illustrated in FIG. 4 which shows the positioning of housing 14, trim ring 22, flexible seal 30, and clamping member 32 after clamping member 32 has been tightened. In this embodiment housing 14 has a lip 60 which has a rectangular indentation 62 with walls 64, 66, and 68. Upper surface 70 of lip 60 is angled at approximately the same angle as leg 38 of clamping member 32 and is in contact with inner surface 48 of leg 38. Trim ring 22 has a flange 72 which is angled at approximately the same angle as leg 40 of clamping member 32 and lower surface 74 of flange 72 is in contact with inner surface 52 of leg 40. Upper surface 76 of flange 72 is in contact with lower surface 78 of lip 60. Preferably, indentation 62 is sized as described above in relation to the embodiment of FIG. 3 so that flexible seal 30 is compressed and contacts walls 64, 66, and 68 and upper surface 76 of flange 72 when clamping member 32 has been tightened to exert a wedging load which squeezes flange 72 and lip 60 thereby compressing flexible seal 30 causing it to deform and contact walls 64, 66, and 68 and upper surface 76 of flange 72 to form an environmental seal. Indentation 62 can take various shapes as described in relation to indentation 28 of the embodiment shown in FIG. 3. In addition, flexible seal 30 need not contact all three walls, 64, 66, and 68 as discussed in reference to the embodiment of FIG. 3.

Figure 5:
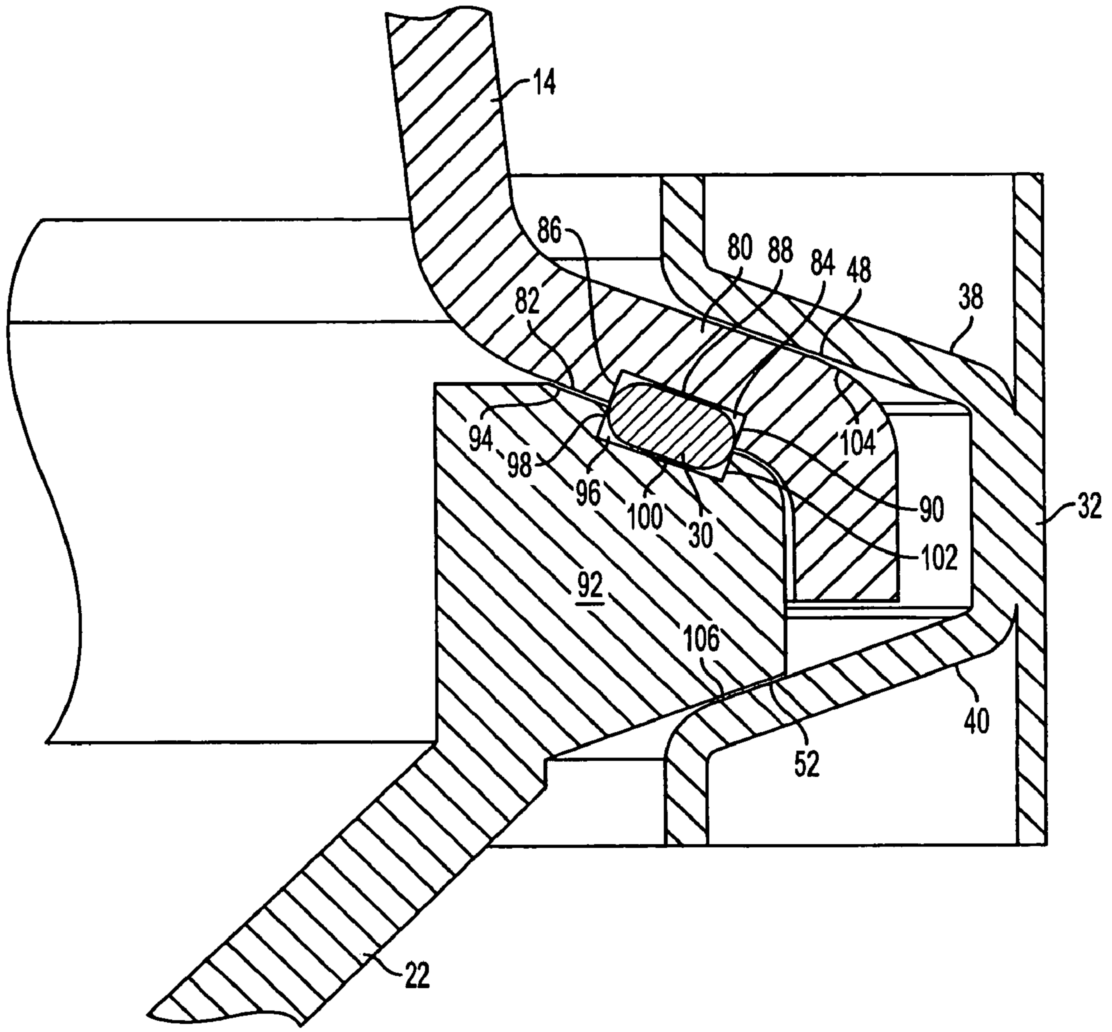
FIG. 5 is a side elevational view, in partial cross-section of an alternative embodiment of the present invention.

Another alternative embodiment of the present invention is shown in FIG. 5. In this embodiment both housing 14 and trim ring 22 have an indentation that together provide an indentation suitably sized for flexible seal 30 to create an environmental seal when clamping member 32 is tightened. Housing 14 has a flange 80 with a lower surface 82 that has a rectangular indentation 84. Indentation 84 has walls 86, 88, and 90. Trim ring 22 has a lip 92 with an upper surface 94 that has a rectangular indentation 96. Indentation 96 has walls 98, 100, and 102. Flange 80 has an upper surface 104 that is in contact with inner wall 48 of leg 38 of clamping member 32. Lip 92 has a lower surface 106 that is in contact with upper surface 52 of leg of clamping member 32. Preferably, indentations 84 and 96 are sized so that flexible seal 30 is in contact with walls 86, 88, 90, 98, 100, and 102 when clamping member 32 has been tightened to exert a wedging load on flange 80 and lip 92. Indentations 84 and 96 have been shown as being of similar size; however, one may be larger than the other one with the only limitation being that flexible member 30 is in contact with all three walls of each indentation. In addition, indentations 84 and 96 can have a variety of shapes as discussed above in relation to FIG. 3, and indentations 84 and 96 can have two different shapes provided that a suitable seal is provided in each. Still further, as discussed above in relation to the embodiment of FIG. 3, flexible seal 30 need not contact all of the walls 86, 88, 90, 98, 100, and 102.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. A surveillance camera comprising: a housing having first and second surfaces; a camera mounted in said housing; a trim ring and dome assembly having first and second surfaces, said first surface of said assembly having an indentation; a flexible member positioned in said indentation; and a clamping member that can be tightened, said clamping member having first and second legs, said first and second surfaces of said housing, said first surface of said assembly and said first leg of clamping member being angled at approximately the same angle and said second surface of said assembly and said second leg of said clamping member being angled at approximately the same angle, said first surface of said housing being in contact with said first surface of said assembly and said second surface of said housing being in contact with said first leg of said clamping member, said second surface of said assembly being in contact with said second leg of said clamping member so that when said clamping member is tightened said first and second legs exert a wedging load on said second surface of said housing and said second surface of said assembly so that said flexible member is compressed and provides a seal between said housing and said assembly.

2. A surveillance camera as recited in claim 1, wherein said indentation is rectangular with three walls and said flexible member is compressed and contacts said three walls of said indentation and said first surface of said housing when said clamping member is tightened.

3. A surveillance camera as recited in claim 2, wherein said flexible member is an O-ring.

4. A surveillance camera as recited in claim 3, wherein said clamping member is a V-band clamp.

5. An enclosure for a surveillance camera comprising: a housing for mounting a surveillance camera, said housing having first and second surfaces; a trim ring and dome assembly having first and second surfaces, said first surface of said assembly having an indentation; a flexible member positioned in said indentation; and a clamping member that can be tightened, said clamping member having first and second legs, said first and second surfaces of said housing, said first surface of said assembly and said first leg of clamping member being angled at approximately the same angle and said second surface of said assembly and said second leg of said clamping member being angled at approximately the same angle, said first surface of said housing being in contact with said first surface of said assembly and said second surface of said housing being in contact with said first leg of said clamping member, said second surface of said assembly being in contact with said second leg of said clamping member so that when said clamping member is tightened said first and second legs exert a wedging load on said second surface of said housing and said second surface of said assembly so that said flexible member is compressed and provides a seal between said housing and said assembly.

6. An enclosure for a surveillance camera as recited in claim 5, wherein said indentation is rectangular with three walls and said flexible member is compressed and contacts said three walls of said indentation and said first surface of said housing when said clamping member is tightened.

7. An enclosure for a surveillance camera as recited in claim 6, wherein said flexible member is an O-ring.

8. An enclosure for a surveillance camera as recited in claim 7, wherein said clamping member is a V-band clamp.

* * * * *